(12) United States Patent
Müller

(10) Patent No.: US 6,236,906 B1
(45) Date of Patent: May 22, 2001

(54) PROCESS AND APPARATUS FOR HAND-CONTROLLED GUIDING OF AN INSTRUMENT IN A PREDETERMINED MOVEMENT REGION

(75) Inventor: Gerhard Müller, Berlin (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/276,862

(22) Filed: Mar. 26, 1999

(30) Foreign Application Priority Data

Mar. 26, 1998 (DE) .............................................. 198 14 630

(51) Int. Cl.[7] .............................. G05B 15/00; G05B 19/00
(52) U.S. Cl. ........................ 700/258; 700/245; 700/248; 700/249; 700/250; 700/251; 700/257; 700/259; 700/260; 700/261; 700/262; 700/264; 901/15; 901/23; 901/28; 901/31; 901/47; 901/48; 74/490.01; 403/13; 403/338
(58) Field of Search ................................... 700/258, 251, 700/245, 257, 250, 264, 262, 259, 260, 261, 249, 248, 112; 901/12, 31, 41, 47, 1, 48, 15, 23, 28; 74/490.01; 403/13, 338

(56) References Cited

U.S. PATENT DOCUMENTS

| | | | |
|---|---|---|---|
| 4,602,345 | * | 7/1986 | Yokoyama ............................ 700/251 |
| 4,766,775 | * | 8/1988 | Hodge .................................. 74/490.01 |
| 4,870,592 | * | 9/1989 | Lampi et al. ......................... 700/112 |
| 5,214,749 | * | 5/1993 | Brown .................................. 700/260 |
| 5,332,352 | * | 7/1994 | Poduje et al. ...................... 414/744.5 |
| 5,553,198 | * | 9/1996 | Wang et al. ........................... 700/245 |

OTHER PUBLICATIONS

Boulic et al., Interactive Identification of the Center of Mass Reachable Space for an Articulated Manipulator, IEEE., pp. 589–594, 1997.*

Doynay, Control of Movement, Postural Stability, and Muscle Angular Stiffness, IEEE., pp. 1373–1377, 1991.*

Martinez et al., A Fuzzy Logic Positioning System for an Articulated Robot Arm, IEEE., pp. 251–257, 1996.*

Erbatur et al., Fuzzy Parameter Adapation for a Sliding Mode Controller as Applied to the Control of an Articulated Arm, IEEE., pp. 817–822, 1997.*

Remis et al., A Geometric Approach to the Design of a Singularity–Free Articulated Arm–Subassembly, IEEE., pp. 3342–3347, 1994.*

Remis et al., Degin of a Singularity–Free Articulated Arm–Subassembly, IEEE, pp. 816–824, 1993.*

* cited by examiner

*Primary Examiner*—William A. Cuchlinski, Jr.
*Assistant Examiner*—McDieunel Marc

(57) ABSTRACT

A process for guiding an instrument in space, in which the instrument is arranged at the free end of an articulated arm whose arm sections are caused to pivot and/or travel with respect to each other by drive units. The instrument is caused to travel in a limited movement region under the control of a control device. For predetermination of the movement region for points that are situated in the movement region, a respective pivot angle and/or travel position between the respective arm sections is set. The respective position and attitude of the instrument is sensed by at least a first measuring device. For hand-controlled guiding of the instrument, an actuating force exerted on the instrument and/or the articulated arm is sensed by a second measuring device. The arm sections are mutually pivoted and/or moved in dependence on the actuating force, the position of the instrument, and the predetermined movement region, such that the instrument moves within the predetermined movement region substantially in the direction of the actuating force.

31 Claims, 2 Drawing Sheets

PROCESS AND APPARATUS FOR HAND-CONTROLLED GUIDING OF AN INSTRUMENT IN A PREDETERMINED MOVEMENT REGION

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a process for guiding in space an instrument arranged at the free end of an articulated arm and to an apparatus for performing the process.

In measuring technology, in material processing, and in particular in medicine, it is frequently the case that three-dimensional free-form surfaces on deformable or inhomogeneous specimens and the like have to be measured or processed. Various processes are as a rule made use of for guiding the measuring or processing instrument along the respective space curves, surfaces, or spatial regions which are to be investigated, in which processes the instrument is arranged at the free end of an articulated arm, and the instrument is moved in a predetermined range of movement by relative pivoting or moving of the individual arm sections.

2. Discussion of Relevant Art

Thus it is known, for example, in the field of microsurgery, and in particular neurosurgery, to cause an instrument which is located at the free end of such an articulated arm to move along a given path curve. The path curve is planned and predetermined before the operation in this case, with reference to the diagnostic results from nuclear spin tomography or computer tomography. The surgeon causes the instrument to travel during the operation by means of an actuating unit, for example a joystick or the like, connected to the control device of the articulated arm drive. The surgeon thus always obtains a mostly optical feedback as to whether or not he is on the predetermined path.

The guiding of the instrument along the predetermined path curve thus takes place here directly by the surgeon. On the one hand, this entails the disadvantage that the travel of the instrument during the whole operation requires a particularly high degree of concentration on the part of the surgeon, or increases the time required for the operation, and small inadvertencies or weakening of concentration can lead to considerable deviations from the predetermined path curve, with possibly serious consequences. On the other hand, control by means of a joystick entails a loss of the surgeon's direct tangible contact with the instrument. A consequence of this is that movements which are not restricted to the two main directions of motion (forward/backward, left/right) of the joystick partially require complex control movements, which require a relatively long working time and high concentration during the operation and therefore provoke operating errors.

In other processes, which are mostly carried out with known industrial robots, the predetermined path curve, etc., is traveled according to a previously programmed course, without this course being influenced by an operator. The instrument is indeed hereby relatively exactly guided along the predetermined path curve, but there is a disadvantage in that deviations in the geometry of the body to be processed or to be investigated with the instrument cannot, or can only at great expense, be sensed and compensated. Thus such processes are not suitable for microsurgery, for example, in which the surgeon must be able to react to any complications due to deviations or changes in the tissue occurring after the planning of the path curve.

SUMMARY OF THE INVENTION

The invention therefore has as its object to provide a process and also an apparatus of the kind stated at the beginning, which do not have, or have only to the smallest degree, the above-mentioned disadvantages, and which in particular make possible a simple and exact as possible guiding of the instrument in a predetermined movement region.

The object is attained by a process for guiding in space an instrument arranged at the free end of an articulated arm whose arm sections can be caused to pivot and/or travel with respect to each other by drive units connected to a control device. The instrument is caused by the drive units under the control of the control device to travel at least in a limited movement region. The process comprises the steps of: setting a respective pivot angle or travel position between respective arm sections and sensing the respective position and attitude of the instrument by at least a first measuring device for predetermination of the limited movement region of the instrument for points that are situated in the limited movement region, sensing for hand-controlled guiding of the instrument an actuating force exerted on the instrument and/or the articulated arm by a second measuring device, and pivoting and/or moving the arm sections with respect to each other, under control of the control unit in dependence on the sensed actuating force, the sensed position of the instrument, and the predetermined movement region, such that the instrument moves within the predetermined movement region substantially in the direction of the actuating force.

The object is also attained by an apparatus for guiding an instrument in space, comprising: an articulated arm with arm sections, drive units that drive the arm sections to pivot and/or travel with respect to each other, a control device connected to the drive units, a first memory connected to the control device, a first measuring device connected to the control device that senses the position and attitude of the instrument, wherein the instrument is connected to the free end of the articulated arm, and wherein in order to predetermine a movement region for the instrument the first memory contains respective first data concerning the pivot angle and/or travel position between respective arm sections for points within the predetermined movement region, and for hand-controlled guiding of the instrument, a second measuring device, connected to the control device, for sensing an actuating force exerted on the instrument and/or the articulated arm, wherein the control device is comprised such that, in dependence on the sensed actuating force and the sensed position of the instrument, the control device causes the drive units to drive the instrument to travel within the predetermined movement region substantially in the direction of the sensed actuating force.

The invention includes the technical teaching that a particularly simple to operate and nevertheless exact guiding of the instrument is attained when, for hand-controlled guiding of the instrument, the actuating force exerted on the instrument and/or the articulated arm is sensed by a second measuring device, and the arm sections are then mutually pivoted and/or moved, under the control of the control device in dependence on the sensed actuating force, the sensed position of the instrument, and the predetermined movement region, such that the instrument moves, substantially in the direction of the actuating force, within the predetermined movement region.

By bringing about the movement of the instrument by means of the sensed actuating force on the instrument or the articulated arm, firstly direct contact between the operator and the instrument is attained, markedly facilitating the operation even in complex paths of movement, since the operator does not have to carry out any involved control movements, but only to exert an actuating force on the instrument or on the articulated arm in the desired direction of movement.

In addition, the control according to the invention of the drive units of the individual arm sections insures that the instrument is caused to move in the previously established movement region. Inadvertently leaving the established movement region is reliably avoided, so that the operator does not have to concentrate so hard on guiding the instrument in the predetermined movement region, but can, for example, devote his concentration in an advantageous manner to other problems, etc., during the guiding of the instrument. This template-like guiding of the instrument is of great advantage precisely in neurosurgery, since the surgeon can then direct his attention more to the surrounding tissue and does not have to be constantly occupied with course corrections.

Several regions of movement are preferably established, between which the operator can choose. This choice can preferably also be made during the guiding of the instrument and, alternatively or additionally, further new regions of movement can be established and chosen, even when guiding of the instrument has already begun.

Furthermore it will be understood that the speed at which the instrument moves can be adjusted in preferred embodiments of the invention. The speed at which the instrument moves can preferably be adjusted by the operator even during the execution of the process, in order to make it possible to navigate in a manner suited to the respective situation. Thus, for example, in a surgical operation, non-critical passages can be traversed quickly, while a careful, slow advance is possible in critical passages.

Preferably, for the control of the drive units, the actual position of the instrument and the direction of the actuating force are continuously or intermittently determined, and that adjacent point is determined which has a position vector which extends from the determined actual position and which deviates least from the direction of the actuating force. The arm sections are then pivoted by the drive units into the angular position corresponding to this determined point, or moved into the corresponding traveled position. This is preferably followed by the determination of the actual position of the instrument and the direction of the actuating force after each pivoting or movement of the arm sections into the position corresponding to the selected point, since a particularly simply constituted control is hereby attained.

The maximum fineness of the resolution of the movement region depends on the movement increments of the drive units. The smaller the angle increment in rotary driving, or the length increment in linear driving, the finer is the attainable resolution of the movement region and thus also the better the approximation of the movement of the instrument to an arbitrarily curved path of travel.

The "movement region" can preferably be at least one space curve, at least one free-form surface, or at least one bounded spatial region, or else a combination of these. In preferred embodiments of the invention, a first subregion is in addition established within the movement region. Traveling to points within the first subregion is then made known by means of at least a first acoustic and/or optical signal. In addition, or alternatively, traveling to points outside the first subregion is made known by at least one second acoustic and/or optical signal. By this means it is possible in a simple manner to define a tolerance region, within which the instrument can be moved, around a predetermined ideal movement region. The operator then obtains a guiding principle by means of the respective acoustic or optical signal as to whether or not he is within the tolerance region.

For example, it is possible to establish the first subregion as a free-form surface which represents the ideal movement region, and to establish the tolerance region by a movement region which extends to both sides of the free-form surface as far as a given perpendicular distance to the free-form surface. In other embodiments, the first subregion may however be a space region or a space curve or a combination of the said possibilities. It is also possible here that several subregions are furthermore established, between which the operator can choose. Furthermore this choice can preferably take place during the guiding of the instrument, and alternatively or additionally further new subregions can be established and selected, even when guiding of the instrument has already begun.

In preferred embodiments of the process according to the invention, a first threshold is predetermined for the magnitude of the determined actuating force, which when exceeded results in pivoting of the arm sections. An exact guiding and positioning of the instrument is hereby possible, since an inadvertent movement of the instrument by a small actuating force, for example, when leaving the guiding hand on the instrument or articulated arm, can be suitably prevented. Alternatively, but preferably additionally, a second threshold is predetermined, below which the pivoting or travel of the arm sections is ended, and the arm sections are fixed in their respective pivoting position and/or travel position. A further, inadvertent movement of the instrument due to a small actuating force is hereby prevented.

Insofar as the drive units are not self-locking, or their retention by friction is insufficient to fix the arm sections in their respective pivoting position and/or travel position, corresponding devices such as brakes and the like can be provided, which are activated when the actuating force falls below the second threshold in order to fix the arm sections in their position, and which are released again when the first threshold is exceeded. Accidental gravity-induced movements of the articulated arm, and thus of the instrument, are thereby reliably excluded.

In particularly favorable embodiments of the process according to the invention, a respective pivot angle and/or a travel position between the respective arm sections is established for the points that are situated in the space which can be reached by the instrument located on the articulated arm. Furthermore, for actuating forces directed out of the predetermined movement region, a third threshold is predetermined for the magnitude of the determined actuating force, and the pivoting and/or travel of the arm sections takes place when this third threshold is exceeded such that the instrument moves substantially in the direction of the point that is adjacent to the sensed actual position and whose position vector from the actual position has the smallest deviation from the direction of the actuating force. Therefore, it is possible to leave the predetermined movement region when the third threshold is exceeded. This makes it possible to react in a simple manner to possible changes in the movement region. Consequently, the positive driving of the instrument in the movement region is not rigid in this variant, but can be overcome according to the respective circumstances by a simple application of correspondingly larger actuating forces.

The travel to points within the movement region is preferably made known by at least a third acoustic and/or optical signal, in order to give the operator a criterion that he is in the predetermined movement region. Additionally or alternatively, the travel to points outside the movement region is made known by at least a fourth acoustic and/or optical signal. The operator then immediately knows that he has left the predetermined movement region. Inadvertently leaving the predetermined movement region is thus immediately recognized.

The control device can be constituted in these variants such that the instrument is again caused to travel in the direction of the predetermined movement region as soon as the actuating force again falls below the third threshold, in order to return to the predetermined movement region. Preferably however, the process enables navigation outside the movement region, even with actuating forces which are below the third threshold, and the positive guiding in the predetermined movement region is only again made use of if the instrument were to be again caused by the operator to travel in the predetermined movement region. It can be provided hereby that the operator receives a hint as to how to get back into the predetermined movement region by the shortest route.

It will be understood that, in favorable variants of the invention, an actuating force threshold which operates in an analogous manner can be provided for leaving the first subregion and for the movement in the tolerance region.

In preferred embodiments of the process according to the invention, in order to sense the position and attitude of the instrument, the pivot angle and the travel position between the respective arm sections are sensed, whence in a simple manner the position and attitude of the instrument can be determined using the known geometry of the arm sections and of the instrument. The sensing of the pivot angle and the travel position between the respective arm sections preferably takes place in a particularly simple embodiment by means of at least one attitude transducer arranged in the connection region between the respective arm sections, for example, by at least one angle transducer in the region of the respective joint. However, it will be understood that other known methods of determining the position of the individual arm sections can also be used.

Particularly advantageous embodiments of the process according to the invention are distinguished in that the sensing of the position and attitude of the instrument takes place in the manner of dead-reckoning navigation. This takes place by the determination of the position of a first connection between two arm sections in space by means of at least three high frequency transmitters which are fixed in space and mutually spaced apart and at least one receiver arranged in the region of the first connection between two arm sections of the articulated arm, and also the sensing of the pivot angle and the travel position of the arm sections between the first connection and the instrument. The determination of the position of a point by means of several high frequency transmitters which are fixed in space and mutually spaced apart and at least one receiver arranged at the point to be determined is well known. The position of the instrument can then be determined with the aid of the position of the first connection and the pivot angle or travel position of the arm sections between the first connection and the instrument, with the known geometry of the arm sections and of the instrument.

The errors which result from errors of the attitude transducers in the above-mentioned embodiments are thereby reduced. Thus, for example, the angle errors of angle transducers arranged in the region of the joints are propagated exponentially to the free end of the articulated arm, so that the articulated arm in this variant has to be made relatively rigid and costly in order to keep these errors small. This error is reduced by the said coupling between the position determination of the receiver arranged on the articulated arm and the sensing of the pivot angle or of the travel position of the arm sections between the first connection and the instrument, since the error of the attitude transducer from the anchorage of the articulated arm as far as the first connection does not enter into the calculation of the instrument position. The articulated arm can therefore be constituted less expensively, without impairing the precision of the position determination of the instrument. In further advantageous variants, these errors arising from the errors of the attitude transducers are completely eliminated, in that the sensing of the position and attitude of the instrument in space takes place by means of at least three high frequency transmitters which are fixed in space and mutually spaced apart, and at least one receiver arranged on the instrument. The articulated arm can then be particularly simple and of light construction, since effects due to errors of the attitude transducers, and deformations of the articulated arm due to its own weight, do not enter into the position determination.

It will be understood that a calibration has to take place in all these variants, in order to insure that there is agreement between the position determination of a point and the pivot angles and travel positions of the arm sections which are established for that point.

In the said variants of position determination by means of high frequency transmitters, five high frequency transmitters which transmit with different modulation frequencies, and a receiver constructed for sensing the phase relation of the high frequency transmitters, are preferably used. The position of the receiver can then be determined exactly from the different phase relations of the modulation frequencies of the individual high frequency transmitters sensed by the receiver and the known, spatially fixed positions of the high frequency transmitters. Furthermore, laser diodes with modulation frequencies between 1 MHz and 10 GHz are used as the high frequency transmitters, the magnitude of the modulation frequencies being arranged according to the particular task and required measurement accuracy.

Sensing of the actuating force can take place in numerous known ways, by force measurement units, torque sensors, etc., arranged on the articulated arm. It is only important here that the magnitudes of the forces, i.e., forces and pairs of forces (torques), acting on the articulated arm due to the actuating force, are completely sensed in three orthogonal spatial dimensions. This preferably takes place in that force sensors and/or torque sensors are provided in the region of the connection between the arm sections for sensing the actuating force.

The basic object is furthermore attained by means of an apparatus of the given category, which includes, for the hand-controlled guiding of the instrument, a second measuring device connected to the control device in order to sense an actuating force exerted on the instrument and/or on the articulated arm, and in which the control device is constituted such that the instrument is caused by the drive units, in dependence on the sensed actuating force and the sensed position of the instrument within the predetermined movement region, to travel substantially in the direction of the actuating force. The control device is then preferably constituted such that, for the determined actual position of the instrument, that point among the adjacent points in the movement region is determined whose position vector extending from the actual position has the smallest deviation from the direction of the actuating force, and the arm sections are pivoted into the angular position corresponding to this point, and/or are caused to travel to the corresponding travel position, by means of the drive units. The process described hereinabove, with all its advantages, is hereby converted into a corresponding apparatus. The control unit preferably includes a processing unit, a first comparator unit connected to the control input of the processing unit, a second memory connected thereto, and alternatively, but preferably additionally, a third memory connected to the first comparator unit. The first comparator unit is connected to the second measuring device. The second memory contains a first threshold data for the magnitude of the actuating force. If this first threshold is exceeded, the first comparator unit releases the actuation of the drive units by the processing unit. The third memory contains, on the other hand, a second threshold data for the magnitude of the actuating force; if the latter falls below this second threshold, the processing unit, controlled by the first comparator unit, ends the actuation of the drive units. The first and second threshold data can then be predetermined, for example, via a corresponding input device or else by the exchange of corresponding memory modules by the operator. As already described hereinabove, an exact guiding and positioning of the instrument is possible in a simple manner by the predetermination of these threshold values for the actuating force.

Insofar as the individual drive units have no self-locking feature, or this is insufficient to fix the articulated arm in its respective position, devices for mutual fixing of the arm sections when the second threshold of the actuating force is exceeded are provided in advantageous variants of the apparatus according to the invention. Simple brakes or the like can be used for this purpose, for example.

In advantageous embodiments of the apparatus according to the invention, for the setting, as already expressly described hereinabove, of a tolerance region within the movement region, it is provided that the control device includes a second comparator unit connected to the first measuring device, and that the first memory includes a first partial region in which the first data is contained, and a second partial region connected to the second comparator unit and containing a second data, by means of which a first subregion within the movement region is established. Furthermore, a first acoustic and/or optical signal device is provided which is connected to the second comparator unit, to emit at least a first acoustic and/or optical signal when traveling to points within the first subregion, and/or to emit at least a second acoustic and/or optical signal when traveling to points outside the first subregion. It is insured thereby in a simple manner that the operator of the apparatus immediately recognizes whether or not he is located in the first subregion.

In order to effect leaving the positive guiding in the predetermined movement region as described hereinabove, in preferred embodiments of the apparatus according to the invention the first memory includes a first partial region, in which the first data are stored, and a third partial region, which contains, for the points which are situated in a space which can be reached by an instrument present on the articulated arm, respectively third data concerning the pivot angle and/or the travel position between the respective arm sections. The control device furthermore includes a processing unit, a changeover switch, a third comparator unit connected to the first switch input of the changeover switch, and a fourth memory connected to the third comparator unit. This fourth memory contains a third threshold data for the magnitude of the actuating force. The first partial region is connected to the first input of the changeover switch, the third partial region with the second input of the changeover switch, the output of the changeover switch to the third comparator unit, and also the third comparator unit to the second measuring device. When the threshold of the third threshold data of the actuating force is exceeded, the third partial region of the first memory is then connected, under the control of the third comparator unit, via the changeover switch to the processing unit, so that the processing unit uses for the control of the drive units the third data deposited in the third partial region, and thus travel is also possible to points outside the predetermined movement region.

Preferably an optical and/or acoustic indication is provided here also, and informs the operator whether the operator is inside or outside the predetermined movement region. For this purpose, the control unit includes a fourth comparator unit connected to the first measuring device and to the first memory, and a second acoustic and/or optical signal device is provided. This is connected to the fourth comparator unit, for the emission of at least a third acoustic and/or optical signal when traveling to a point within the movement region and/or for the emission of at least a fourth acoustic and/or optical signal on traveling to points outside the movement region.

In a particularly favorable embodiment of the apparatus according to the invention, the control device includes a fifth comparator unit, connected to the first measuring device and to the first partial region of the first memory, and also an AND circuit, the output of which is connected to the second switch input of the changeover switch. The AND circuit has a first input which is connected to the output of the fifth comparator unit, and an inverting second input which is connected to the output of the third comparator unit. If the actuating force is below the threshold of the third threshold datum and if at the same time points within the predetermined movement region are traveled to the first partial region is connected via the changeover switch to the processing unit, whereby the processing unit accesses the first data stored in the first partial region for the control of the drive units, and positive guiding is thus produced in the predetermined movement region. Thus if the predetermined movement region was departed from and is now traveled to anew with a correspondingly small actuating force, the positive drive in the predetermined movement region is reestablished on entering into the predetermined movement region.

It will be understood that the content of all the memories can be predetermined and altered by the operator in advantageous variants of the invention, for example by means of a corresponding input device or else by exchanging corresponding memory modules; this can preferably also take place during the operation of the apparatus.

Advantageous embodiments of the apparatus according to the invention regarding the sensing of the position and attitude of the instrument and also the sensing of the actuating force, which variants translate into the corresponding variants of the process according to the invention, have already been expressly described hereinabove.

BRIEF DESCRIPTION OF THE DRAWINGS

Preferred embodiments of the invention are described in further detail hereinbelow with reference to the accompanying drawings, in which.

DETAILED DESCRIPTION OF PREFERRED EMBODIMENTS

Figure 1:
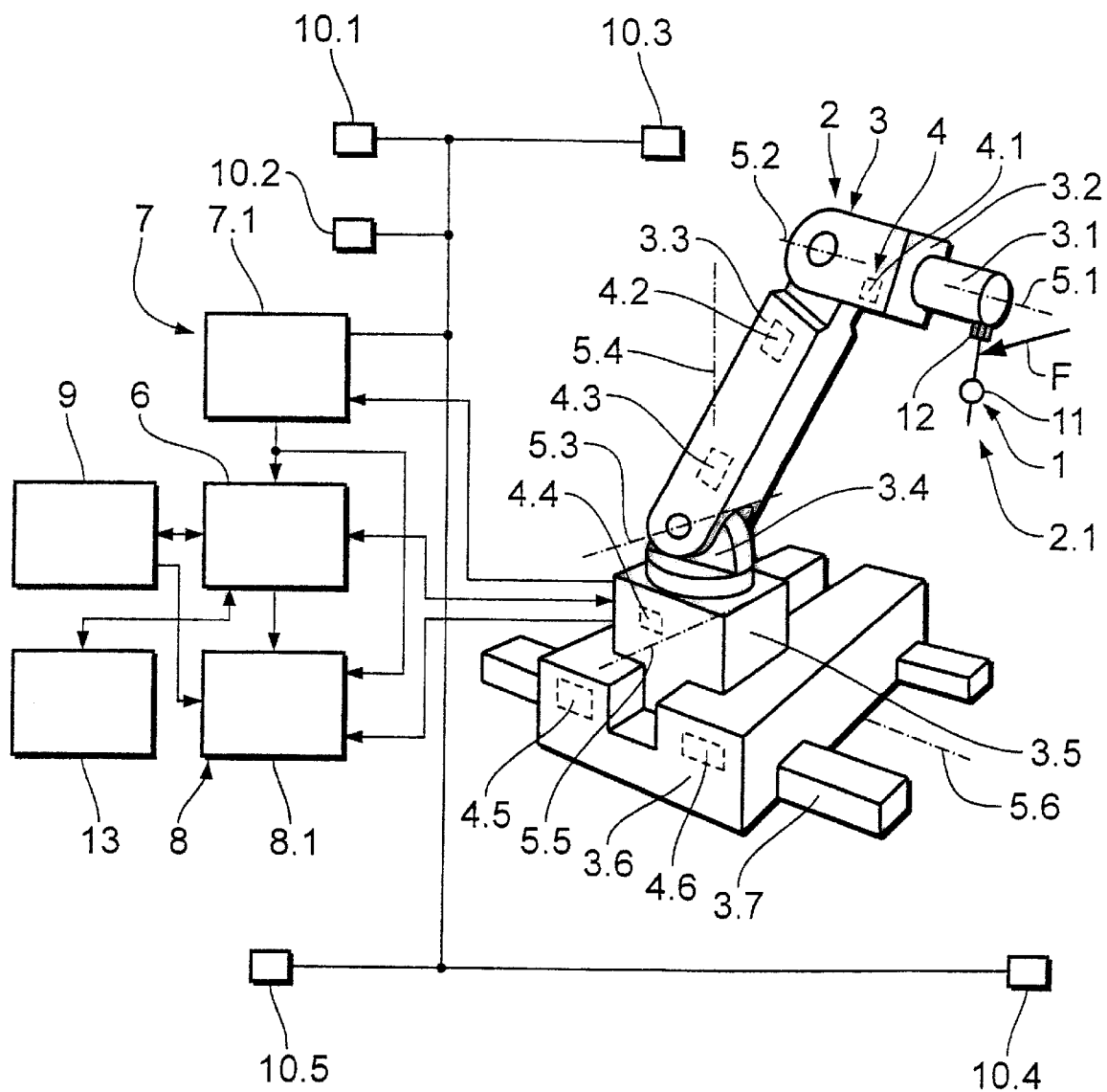
FIG. 1 shows a schematic representation of a preferred embodiment of the apparatus according to the invention.

FIG. 1 shows a schematic representation of a preferred embodiment of the apparatus according to the invention with which the process according to the invention can be carried out. In this variant, an instrument 1 is arranged at the free end 2.1 of an articulated arm 2. The arm sections 3 of the articulated arm 2 are mutually pivotable or movable with respect to each other by means of drive units 4. The first arm section 3.1 and the second arm section 3.2 are then pivoted around the pivot axis 5.1 with respect to each other by means of the first drive unit 4.1. The second arm section 3.2 and the third arm section 3.3 are pivoted around the second pivot axis 5.2 with respect to each other by means of the second drive unit 4.2. The third arm section 3.3 and the fourth arm section 3.4 are pivoted around the third pivot axis 5.3 with respect to each other by means of the third drive unit 4.3. The fourth arm section 3.4 and the fifth arm section 3.5 are pivoted around the fourth pivot axis 5.4 with respect to each other by means of the fourth drive unit 4.4. The fifth arm section 3.5 and the sixth arm section 3.6 are moved to each other along the fifth axis 5.5 by the fifth drive unit 4.5, and likewise the sixth arm section 3.6 is moved along the sixth axis 5.6 to the seventh arm section 3.7, which is anchored firmly to the floor, by the sixth drive unit 4.6. The drive units 4.1 through 4.6 are connected to a control unit 6, from which control pulses are obtained for pivoting or travel of the arm sections 3.1–3.6 with respect to each other.

The drive units 4.1–4.6 are respectively provided with an incremental attitude transducer (not shown in FIG. 1) by means of which the pivot angle or the travel position between the respective arm sections is sensed and sent to the control unit 6. This information regarding the respective pivot angles or respective travel positions of the individual arm sections is used in the regulation of the drive units in order to detect reaching the target position of the respective arm section during pivoting or travel. Stepping motors are used as drive units in the example shown. The stepping size of the motors used, or the increment of the position transducers used, respectively conforms to a given pivoting increment or travel increment between the arm sections. The maximum resolution of the movement region of the instrument in individual travel points then results from the respectively greater of the two increments.

Furthermore, a first measuring device 7 which senses the respective position and attitude of the instrument 1, a second measuring device 8 which senses an actuating force F exerted on the instrument 1, and a first memory 9, in which first data on the pivot angle and travel positions of the arm sections 3.1–3.7 are stored for the starting points of the instrument in a predetermined movement region, are provided. Both measuring devices 7 and 8 and also the first memory 9 are connected to the control device 6.

In the illustrated embodiment, the measuring device 7 includes a first signal processing device 7.1 and, connected to it, five high frequency transmitters which are installed at fixed positions in space and are mutually spaced apart, and which are constituted by laser diodes 10.1–10.5 which transmit with respective different modulation frequencies. The measuring device 7 furthermore includes a photoelectric receiver 11 arranged on the instrument 1 and constituted for sensing the phase relations of the laser diodes 10.1–10.5. The position of the receiver 11 and hence the position of the instrument 1 is exactly determined in the first signal processing device 7.1 from the different phase relations of the modulation frequencies of the individual laser diodes 10.1–10.5, sensed by the receiver 11, and from the known, spatially fixed positions of the laser diodes 10.1–10.5.

It will be understood that in other embodiments the position of the instrument can be determined in other ways. Thus for example it is possible to use the data of the attitude transducers of the drive units in order to determine the position of the instrument from this data and the known geometry of the arm sections and of the instrument. Furthermore it is possible, for example when space is limited, or the like, to install the receiver on the second arm section instead of on the instrument, and then to calculate the position of the instrument from the position of the receiver and the data of the attitude transducers of the first and second drive units and also the geometry of the relevant arm sections and of the instrument.

In the embodiment shown, a second measuring device 8 includes a second signal processing device 8.1 and a measuring unit 12 which is connected thereto, which is arranged in the connection region of the instrument 1 to the first arm section 3.1, and which measures the forces and moments acting on the instrument 1 in the respective directions of three orthogonal axes. The amount and direction of the actuating force F is then calculated in the second signal processing device 8.1 from the measurement values of the measuring unit 12, the attitude and position of the instrument calculated in the first signal processing device 7.1, and the first data contained in the first memory concerning the pivot angles or travel positions of the arm sections 3.1–3.7 existing in this position. For this purpose, the second signal processing device 8.1 is connected to the first signal processing device 7.1 and the first memory 9.

It will be understood that the actuating force can also be determined in other ways in other embodiments. Thus it is possible, for example, to install respective force and/or torque transducers in the connection regions of the arm sections, and the actuating force can then be determined in a known manner from their measurement values, together with the known geometry of the arm sections and of the instrument, and also the attitude of the arm sections and of the instrument.

Furthermore, an input unit 13 connected to the control unit 6 is provided, by means of which the content of the first memory 9 or the parameters of the control can be altered.

The control device 6, the first and second signal processing devices 7.1 and 8.1, the first memory 9, and also the input unit 13 can then be constituted by a conventional computer with corresponding input devices such as a keyboard, mouse, etc., the signal processing and the control then being effected by corresponding software.

Figure 2:
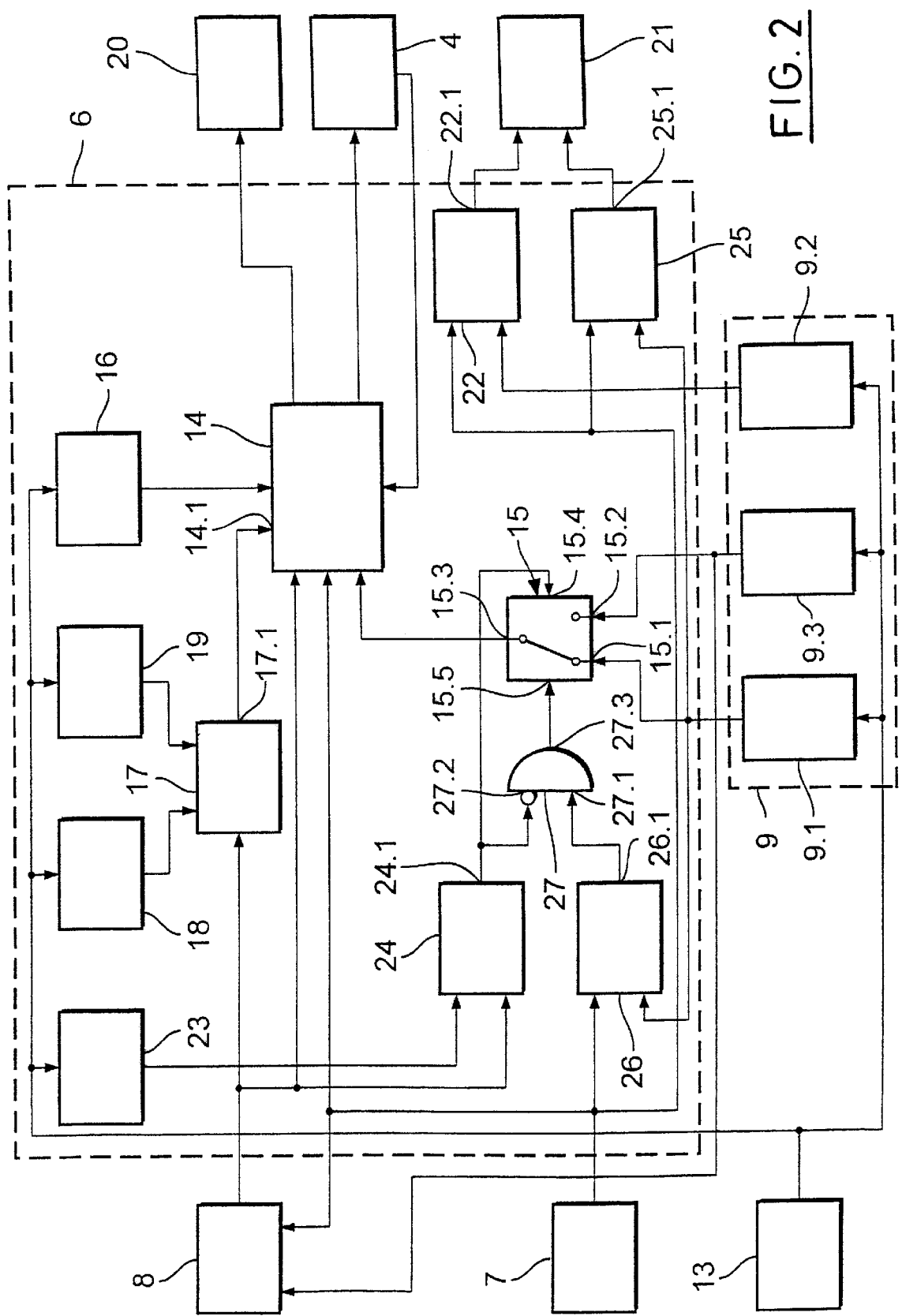
FIG. 2 shows the block diagram of the embodiment of FIG. 1.

FIG. 2 shows a block circuit diagram of the embodiment of FIG. 1. The control device 6 includes a processing unit 14, which is connected to the first measuring device 7, the second measuring device 8, the first memory 9 and the drive units 4.

The first memory 9 includes a first partial region 9.1 in which first data regarding the respective pivot angle or the respective travel position between the individual arm sections 3 of the articulated arm 2 are stored for each point to which the instrument 1 can be caused to travel within a predetermined movement region. Furthermore, the first memory 9 includes a second partial region 9.2 containing second data regarding the travel points of a first subregion of the predetermined movement region of the instrument 1. The second data consequently represent a subset of the first data.

A reference movement region within the predetermined movement region of the instrument is established by the first subregion, while the remainder of the predetermined movement region represents a tolerance region for the movement of the instrument. In the embodiment shown, the first subregion concerns a spatial free-form surface on which the instrument is to travel according to what is possible, while the predetermined movement region concerns a movement space whose boundary runs on both sides of the free-form surface of the first subregion, and at a constant distance from the free-form surface.

The first memory 9 furthermore includes a third partial region 9.3 in which third data regarding the respective pivot angle or the respective travel position between the individual arm sections 3 of the articulated arm 2 are stored for each point to which the instrument 1 can be caused to travel within the possible range of movements of the articulated arm 2. The first data consequently represent a subset of the third data.

The content of the partial regions 9.1–9.3 of the first memory 9 was then set by corresponding input by means of the input unit 13 before bringing the apparatus into service. It will be understood that for this purpose a calibration of the system took place first, in order to insure that for the predetermined pivot angles or travel positions of the arm sections, the instrument in fact traveled to the corresponding points. It will furthermore be understood that in other embodiments, several first, second and third partial regions can be provided, in which different movement regions can be established, between which the operator of the apparatus can select, even during the operation of the apparatus.

The first partial region 9.1 is connected to the first input 15.1 of a changeover switch 15, while the third partial region 9.3 is connected to the second input 15.2 of the changeover switch 15. The output 15.3 of the changeover switch 15 is connected to the processing unit 14.

The processing unit 14 sends control pulses to the drive units 4 during the operation of the apparatus. These control pulses depend on the position of the instrument 1 as sensed by the first measuring device 7, the actuating force F sensed by the second measuring device 8, and, according to which of the two partial regions of the first memory 9 is connected to the processing unit 14 via the changeover switch 15, on the content of the first or third partial region 9.1 or 9.3. Then in the processing unit 14, with access to a program stored in a program memory 16 connected to the processing unit 14, that point of the partial region 9.1 or 9.3 connected to the processing unit 14 is determined which is adjacent to the position of the instrument at that time as sensed by the first measuring device 7 and whose position vector starting from the sensed position of the instrument at that time has the smallest deviation from the direction of the actuating force F sensed by the second measuring device 8. The processing unit 14 then sends to the drive units 4 control pulses corresponding to this determined point, so that the arm sections are pivoted into the angular position corresponding to this point, or are moved into the corresponding travel position, by the drive units 4. When this has taken place, the operation begins anew.

In FIG. 2, the first partial region 9.1 of the first memory 9 is connected to the processing unit 14, so that the instrument 1 in this case consequently travels only to points which lie within the predetermined movement region corresponding to that set in the first partial region 9.1.

In order to insure an exact and reliable positioning of the instrument 1, a first threshold is predetermined for the actuating force and has to be exceeded by the actuating force in order to release a movement of the instrument 1. Furthermore, a second threshold for the actuating force is predetermined, below which the movement of the instrument is stopped.

The processing unit includes for this purpose a first comparator unit 17 connected to the control input 14.1 of the processing unit, and a second memory 18 and a third memory 19 connected to the first comparator unit 17. The first comparator unit 17 is furthermore connected here to the output of the second measuring device 8. The second memory contains a first threshold datum corresponding to the first threshold for the magnitude of the actuating force. If this threshold is exceeded by the actuating force sensed by the second measuring device 8, a first state is then applied to the output 17.1 of the first processing unit 14 and hence to the control input 14.1 of the processing unit 14, and releases the production of the control signals and hence the actuation of the drive units 4 by the processing unit 14. In contrast, the third memory 19 contains a second threshold data, corresponding to the second threshold, for the magnitude of the actuating force. Below this second threshold, a second state is applied to the output 17.1 of the first comparator unit 17 and hence to the control input 14.1 of the processing unit 14, and ends the production of control signals and hence the actuation of the drive units 4 by the processing unit 14.

The first and second threshold data can be predetermined here via the input device 13 by the operator, even during the operation of the apparatus. The first threshold is then greater than the second threshold. However, it will be understood that in other variants the first threshold can be equal to the second threshold, and then only one memory is to be provided for this.

In the embodiment shown, the individual drive units 4 have no sufficient self-locking in order to fix the articulated arm 2 in its respective position after the ending of the travel of the instrument 1. Thus in the described apparatus, brakes 20 (not shown in FIG. 1) are provided which fix the arm sections relative to each other, controlled by the processing unit 14, at values of the actuating force below the second threshold. If the first threshold of the actuating force is again exceeded, these brakes 20 are released under the control of the processing unit 14.

In the apparatus shown, it is furthermore provided that the operator receives a first optical and acoustic signal from the apparatus by means of a first signal device 21 when the position of the instrument 1 sensed by the first measuring device 7 is situated within the subregion established in the second partial region 9.2 of the first memory 9. For this purpose, a second comparator unit 22 is provided, connected to the first measuring device 7 and to the second partial region 9.2 of the first memory 9, and with its output 22.1 connected to the signal device 21.

In the apparatus shown, it is furthermore provided that the positive guiding in the movement region predetermined by the content of the first partial region 9.1 can be left by the application of an actuating force which is situated above a third threshold, in that the third partial region 9.3 of the first memory 9 is connected via the changeover switch 15 to the processing unit 14. The control device includes for this purpose a fourth memory 23, which contains a third threshold datum for the magnitude of the actuating force, corresponding to the third threshold. Furthermore, a third comparator unit 24 is provided which is connected to the second measuring device 8 and to the fourth memory 23, and whose output 24.1 is connected to the first switch input 15.4 of the changeover switch 15. If the actuating force sensed by the second measuring device 8 exceeds the third threshold, a switch pulse is present at the output 24.1 of the third comparator unit 24 and hence at the first switch input 15.4 of the changeover switch 15, due to which the changeover switch 15 connects the third partial region 9.3 of the first memory 9 to the processing unit 14, so that the processing unit uses the third data stored in the third partial region for the control of the drive units, and thus even points which are outside the movement region predetermined in the first partial region can be traveled to.

It will be understood that the content of the fourth memory 23 can also be predetermined or altered by the operator by means of the input device 13, even during the operation of the apparatus.

Here also an optical and acoustic indication is provided which informs the operator whether he is inside or outside the predetermined movement region. For this purpose, a fourth comparator unit 25 is provided, which is connected to the first measuring device 7 and to the first partial region 9.1 of the first memory 9, and whose output is connected to the signal device 21.

It is furthermore provided that the positive guiding in the predetermined movement region is reestablished on entering the predetermined movement region when the predetermined movement region was left by the application of corresponding actuating forces, and then traveled to with a correspondingly small actuating force. For this purpose, there are provided a fifth comparator unit 26 connected to the first measuring device 7 and to the first partial region 9.1 of the first memory, and also an AND circuit 27 whose output 27.3 is connected to the second switch input of the changeover switch 15. The AND circuit 27 has a first input 27.1 which is connected to the output 26.1 of the fifth comparator unit 26, and also an inverting second input 27.2 which is connected to the output 24.1 of the third comparator unit 24. If the actuating force is below the third threshold of the third threshold data, and if the position of the instrument 1 sensed by the first measuring device 7 is at the same time situated within the movement region predetermined in the first partial region 9.1, a switch pulse is then present at the output 27.3 of the AND circuit 27 and hence at the second switch input 15.5 of the changeover switch 15, due to which the changeover switch 15 connects the first partial region 9.1 with the processing unit 14, whereby the processing unit 14 accesses the data stored in the first partial region 9.1 for the control of the drive units 4, and the positive guiding in the predetermined movement region is thus reestablished.

The invention is not limited in its embodiment to the preferred embodiments described hereinabove. Rather, a number of variants are possible, which also make use of embodiments of quite a different nature from the illustrated solution.

I claim:

1. A process for guiding in space an instrument arranged at the free end of an articulated arm whose arm sections are driven to at least one of pivot and travel with respect to each other by drive units connected to a control device, the instrument being driven by the drive units to travel at least in a limited movement region under the control of the control device, comprising the steps of:

setting at least one of a respective pivot angle and travel position between respective arm sections and sensing the respective position and attitude of the instrument sensing an actuating force exerted on at least one of the instrument and the articulated arm by a second measuring device for hand-controlled guiding of the instrument, and at least one of pivoting and moving the arm sections with respect to each other, under control of the control unit in dependence on the sensed actuating force, the sensed position of the instrument, and the predetermined movement region, such that the instrument moves within the predetermined movement region substantially in the direction of the actuating force.

2. The process according to claim 1, further comprising the steps of continuously or intermittently determining the actual position of the instrument and the direction of the actuating force, determining from points adjacent to the actual position that point whose position vector extending from the actual position has the smallest deviation from the direction of the actuating force, and driving the arm sections by the drive units to at least one of pivot into an angular position and travel into a travel position corresponding to that latter point.

3. The process according to claim 1, further comprising the step of including in the movement region at least one of a space curve, a free-form surface and a spatial region.

4. The process according to claim 1, further comprising the steps of at least one of predetermining a first threshold for the magnitude of the sensed actuating force and at least one of pivoting and moving the arm sections when the first threshold is exceeded, and predetermining a second threshold for the magnitude of the sensed actuating force, and ending the pivoting and travel of the arm sections and fixing the arm sections in their pivoting position and travel position, when the sensed actuating force falls below the second threshold.

5. The process according to claim 1, further comprising the steps of establishing a first subregion within the movement region, and at least one of making known travel to points within the first subregion by at least one of a first acoustic signal and a first optical signal, and making known travel to points outside the first subregion by at least one of a second acoustic signal and a second optical signal.

6. The process according to claim 1, further comprising the steps of establishing at least one of a respective pivot angle and a travel position between the respective arm sections for the instrument for points that are situated in space that can be reached by the instrument, located on the articulated arm, and establishing a third threshold for the magnitude of the actuating force, and on exceeding the third threshold causing at least one of the pivoting and travel of the arm sections such that the instrument moves substantially in the direction of that point that is adjacent to the sensed actual position whose position vector extending from the actual position has the smallest deviation from the direction of the actuating force.

7. The process according to claim 6, further comprising the steps of at least one of making known travel to a point within the predetermined movement region by at least one of a third acoustic signal and a third optical signal and making known travel to a point outside the predetermined movement region by at least one of a fourth acoustic and a fourth optical signal.

8. The process according to claim 1, further comprising the step of sensing the pivot angle and the travel position between the respective arm sections in order to sense the position and attitude of the instrument.

9. The process according to claim 8, further comprising the step of sensing the pivot angle and the travel position between the respective arm sections by at least one position transducer arranged in the region of connection between the respective arm sections.

10. The process according to claim 1, further comprising the steps of sensing the position and attitude of the instrument in the manner of dead-reckoning navigation, by determining the position of a first connection between two arm sections in space by at least three high frequency transmitters that are spatially fixed and spaced apart from each other, and at least one receiver arranged in the region of the first connection between two arm sections of the articulated arm, and sensing the pivot angle and the travel position of the arm sections between the first connection and the instrument.

11. The process according to claim 10, further comprising the step of employing five high frequency transmitters that transmit at different modulation frequencies, and a receiver that senses the phase relation of the high frequency transmitters.

12. The process according to claim 1, further comprising the step of sensing the position and attitude of the instrument in space by at least three high frequency transmitters that are spatially fixed and spaced apart from each other and at least one receiver arranged on the instrument.

13. The process according to claim 10, further comprising the step of employing laser diodes, as the high frequency transmitters that transmit with modulation frequencies between 1 MHz and 10 GHz.

14. The process according to claim 1, further comprising sensing the actuating force by at least one of force sensors and torque sensors arranged in the region of connections between the arm sections.

15. An apparatus for guiding an instrument in space, comprising:

an articulated arm with arm sections, drive units that drive the arm sections to at least one of pivot and travel with respect to each other, a control device connected to the drive units, a first memory connected to the control device, a first measuring device connected to the control device that senses the position and attitude of the instrument;

wherein the instrument is connected to the free end of the articulated arm, and wherein in order to predetermine a movement region for the instrument the first memory contains respective first data concerning at least one of the pivot angle and travel position between respective arm sections for points within the predetermined movement region, and for hand-controlled guiding of the instrument, a second measuring device, connected to the control device, for sensing an actuating force exerted on at least one of the instrument and the articulated arm;

wherein the control device is comprised such that, in dependence on the sensed actuating force and the sensed position of the instrument, the control device causes the drive units to drive the instrument to travel within the predetermined movement region substantially in the direction of the sensed actuating force.

16. The apparatus according to claim 15, in which the control device is comprised such that for the sensed actual position of the instrument, that point is determined, among adjacent points in the predetermined movement region, whose position vector extending from the actual position has the smallest deviation from the direction of the actuating force, and the arm sections are at least one of pivoted into an angular position and caused to travel into a travel position corresponding to that point, by the drive units.

17. The apparatus according to claim 15, in which the movement region includes at least one of a space curve, free-form surface and spatial region.

18. The apparatus according to claim 15, in which the control device includes a processing unit having a control input, a first comparator unit connected to the control input and to the second measuring device, a second memory connected to the comparator unit, and a third memory connected to the comparator unit, wherein:

the second memory contains first threshold data for the magnitude of the actuating force, for actuating the drive units through the first comparator unit, on exceeding a first threshold of the actuating force, under the control of the processing unit, and the third memory contains second threshold data for the magnitude of the actuating force for ending actuation, through the first comparator unit, on falling below a second threshold of the actuating force, under the, control of the processing unit.

19. The apparatus according to claim 18, further comprising fixing devices connected to the processing unit for mutual fixation of the arm sections, on falling below the second threshold of the actuating force, under the control of the processing unit.

20. The apparatus according to claim 15, in which the control device includes a second comparator unit connected to the first measuring device, and the first memory includes a first partial region in which the first data is stored, and a second partial region that is connected to the second comparator unit and contains second data by which a first subregion is established within the movement region, further comprising at least one of a first acoustic signal device and a first optical signal device that is connected to the second comparator unit for at least one of emission of at least one of a first acoustic signal and a first optical signal on traveling to points within the first subregion and emission of at least one of a second acoustic signal and a second optical signal on travelling to points outside the first subregion.

21. The apparatus according to claim 15, in which the first memory includes a first partial region in which the first data is stored, and a third partial unit that contains respective third data concerning at least one of the pivot angle and the travel position between the respective arm sections for points that are situated in space that can be reached by the instrument located on the articulated arm, and the control unit includes a processing unit, a changeover switch having a first switch input, first and second additional connected to the first switch input and to the second measuring device, and a fourth memory connected to the third comparator unit, wherein the first partial region is connected to the first additional input of the changeover switch, the third partial region is connected to the second additional input of the changeover switch, and the output of the changeover switch is connected to the processing unit, the fourth memory contains third threshold data for the magnitude of the actuating force, and the third comparator unit and the changeover switch are arranged such that on exceeding the third threshold data, the third partial region is connected to the processing unit, under the control of the third comparator unit via the changeover switch.

22. The apparatus according to claim 21, in which the control unit includes a fourth comparator that is connected to the first measuring device and to the first memory, further comprising at least one of a second acoustic device and a second optical signal device that is connected to the fourth comparator unit that emits at least one of a third acoustic signal and third optical signal on traveling to points within the predetermined movement region and that emits at least one of a fourth acoustic signal and a fourth optical signal on traveling to points outside the predetermined movement region.

23. The apparatus according to claim 21, in which the changeover switch has a second switch input, the third comparator unit has an output, and the control device includes a fifth comparator unit that is connected to the first measuring device and to the first partial region of the first memory and an AND circuit, with an output connected to the second switch input of the changeover switch, wherein the AND circuit has a first input connected to the output of the fifth comparator unit, and an inverting second input connected to the output of the third comparator unit, and the third comparator unit, the fifth comparator unit and the changeover switch are comprised such that, with an actuating force below the threshold of the third threshold data, and an instrument position within the movement region, the first partial region is connected to the processing unit by the changeover switch.

24. The apparatus according to claim 15, in which the first measuring device for sensing the position and attitude of the instrument includes first measuring units for sensing the pivot angle and the travel position between the respective arm sections.

25. The apparatus according to claim 24, in which the first measuring units comprise position transducers arranged in the connection region of the arm sections.

26. The apparatus according to claim 25, in which the position transducers comprise angle transducers arranged in the region of a respective joint.

27. The apparatus according to claim 15, in which the first measuring unit, for sensing the position and attitude of the instrument in the manner of a dead-reckoning navigation, includes at least three high frequency transmitters that are spatially fixed and spaced apart from each other, and at least one receiver arranged in the region of a first connection between two arm sections of the articulated arm, and the first measuring device also includes first sensing measuring units for sensing the pivot angle and the travel position of the arm sections between the first connection and the instrument.

28. The apparatus according to claim 27, in which the first measuring unit includes five high frequency transmitters that transmit at different modulation frequencies, and a receiver arranged for sensing the phase position of the high frequency transmitters.

29. The apparatus according to claim 27, in which the high frequency transmitters comprise laser diodes, which transmit at modulation frequencies between 1 MHz and 10 GHz.

30. The apparatus according to claim 15, in which the first measuring device for sensing the position and attitude of the instrument in space includes at least three high frequency transmitters that are spatially fixed and spaced apart from each other and at least one receiver arranged in the region of the instrument.

31. The apparatus according to claim 15, in which the second measuring unit includes at least one of force sensors and torque sensors arranged in the regions of connections between the arm sections.

* * * * *